(12) United States Patent
Park et al.

(10) Patent No.: US 12,365,333 B2
(45) Date of Patent: Jul. 22, 2025

(54) FORWARD COLLISION-AVOIDANCE ASSIST SYSTEM AND A METHOD THEREOF

(71) Applicants: HYUNDAI MOTOR COMPANY, Seoul (KR); KIA CORPORATION, Seoul (KR)

(72) Inventors: Joo Hyeok Park, Hwaseong-si (KR); Kyeong Yeon Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 131 days.

(21) Appl. No.: 18/140,753

(22) Filed: Apr. 28, 2023

(65) Prior Publication Data

US 2024/0042996 A1 Feb. 8, 2024

(30) Foreign Application Priority Data

Aug. 8, 2022 (KR) .................. 10-2022-0098392

(51) Int. Cl.
*B60W 30/09* (2012.01)
*B60W 10/18* (2012.01)
*B60W 10/20* (2006.01)
*B60W 50/14* (2020.01)

(52) U.S. Cl.
CPC .......... *B60W 30/09* (2013.01); *B60W 10/18* (2013.01); *B60W 10/20* (2013.01); *B60W 50/14* (2013.01); *B60W 2554/00* (2020.02)

(58) Field of Classification Search
CPC ...... B60W 30/09; B60W 10/18; B60W 10/20; B60W 50/14; B60W 2554/00; B60W 2050/143; B60W 2552/30; B60W 2554/20; B60W 2554/40; B60W 2710/18; B60W 2710/20; B60W 30/0956; B60W 40/02;
(Continued)

(56) References Cited

U.S. PATENT DOCUMENTS

| | | | |
|---|---|---|---|
| 2009/0254253 A1* | 10/2009 | Ghoneim | B62D 5/0463 701/42 |
| 2011/0199231 A1* | 8/2011 | Loiselle | G09F 9/33 340/907 |
| 2016/0207534 A1* | 7/2016 | Nishimura | B60W 30/18145 |

(Continued)

*Primary Examiner* — Joseph J Dallo
(74) *Attorney, Agent, or Firm* — Lempia Summerfield Katz LLC

(57) ABSTRACT

A forward collision-avoidance assist (FCA) system and method that prevents a too sensitive operation of anti-collision control such as unnecessary braking or an avoidance control due to sensing of an oncoming vehicle even when a risk of collision is lowered by temporary lane crossing performed based on a surrounding situation. The FCA system includes: a sensor unit to sense a situation in front of a subject vehicle; a collision avoidance logic adjuster configured to adjust a target selection condition for selecting an oncoming vehicle having a risk of collision based on forward situation data; a collision avoidance determiner configured to select the oncoming vehicle by applying the adjusted target selection condition and determine a collision risk value; and a collision avoidance controller configured to automatically control braking or steering of the subject vehicle when the collision risk value is greater than or equal to a preset value.

20 Claims, 12 Drawing Sheets

(58) Field of Classification Search
CPC ........... B60W 2554/4023; G06V 20/58; G06V 20/588; B60Y 2400/90
See application file for complete search history.

(56) References Cited

U.S. PATENT DOCUMENTS

| | | | |
|---|---|---|---|
| 2020/0180629 A1* | 6/2020 | Song | B60W 10/06 |
| 2022/0051565 A1* | 2/2022 | Hui | G08G 1/166 |
| 2022/0289173 A1* | 9/2022 | Matsuda | B60W 40/13 |
| 2022/0340160 A1* | 10/2022 | Nayhouse | B60W 60/001 |
| 2022/0379883 A1* | 12/2022 | Bruno | B60W 50/087 |
| 2022/0383750 A1* | 12/2022 | Sharma Banjade | G08G 1/005 |
| 2023/0401443 A1* | 12/2023 | Komorkiewicz | G06V 10/95 |

* cited by examiner

FORWARD COLLISION-AVOIDANCE ASSIST SYSTEM AND A METHOD THEREOF

CROSS-REFERENCE TO RELATED APPLICATION

This application claims the benefit of and priority to Korean Patent Application No. 10-2022-0098392, filed on Aug. 8, 2022, the entire contents of which are incorporated herein by reference.

BACKGROUND

Field

The present disclosure relates to a forward collision-avoidance assist (FCA) system and a method preventing anti-collision control from sensitively operating (e.g., unnecessary braking or avoidance) due to sensing of an oncoming vehicle even when a risk of collision is lowered through temporary lane crossing performed in consideration of a surrounding situation.

Related Art

In general, a forward collision-avoidance assist (FCA) system of a vehicle may recognize a front vehicle traveling ahead using information obtained from various sensors provided in the vehicle and warn the driver of a potential collision to reduce the damage that may be caused thereby.

In particular, FCA-direct oncoming (DO) (FCA-DO) control is provided in preparation for a collision with an oncoming vehicle or two-wheeled vehicle that approaches from ahead on a driving lane. The FCA-DO control may be performed in an emergency to automatically operate a brake to decelerate or stop, or operate a steering system to avoid the collision.

In this case, FCA, for the oncoming vehicle, is limited to a vehicle that travels straight within a driving path of a subject vehicle, and thus a vehicle traveling in an oncoming (i.e. the opposite) direction within a certain range (e.g., ±5 deg) of angle may be selected as a target vehicle to which FCA is applied.

In addition, when the specified target vehicle continues traveling with a current heading angle, and an overlap range with a front vehicle is within a preset range, it may be determined that a dangerous situation requiring braking control or avoidance control occurs.

The FCA system may improve the accuracy of collision avoidance control by compensating for a measurement error of a sensor and generating a collision probability map, and calculating a collision risk value based thereon.

However, when a lane is temporarily changed due to a construction site or an obstacle, an oncoming vehicle that temporarily enters a lane of the subject vehicle may be erroneously recognized as a vehicle having a risk of collision, and a collision avoidance logic may operate sensitively.

Accordingly, the FCA system may need to meet conflicting requests—a request for expanding an operable area to improve a collision avoidance effect in various driving situations, and a request for preventing a sensitive operation due to a sensing error that may be caused by an environment around a subject traveling vehicle.

The statements in this BACKGROUND section merely provide background information related to the present disclosure and may not constitute prior art.

SUMMARY

One or more aspects of the present disclosure provide a forward collision-avoidance assist (FCA) system and method that prevents a sensitive operation of collision avoidance control, such as, unnecessary braking or avoidance that may be performed by sensing an oncoming vehicle by a sensing unit even when a risk of collision is lowered due to temporary lane crossing performed in consideration of a surrounding situation.

According to an embodiment, a forward collision-avoidance assist (FCA) system includes: a sensor unit configured to sense a situation in front of a subject vehicle provided with a collision-avoidance assist system, a collision avoidance logic adjuster configured to adjust a target selection condition for selecting an oncoming vehicle having a risk of collision based on forward situation data obtained by the sensing of the sensor unit, a collision avoidance determiner configured to select the oncoming vehicle by applying the adjusted target selection condition and determine a collision risk value, and a collision avoidance controller configured to automatically control braking or steering while warning a driver when the collision risk value is greater than or equal to a preset value.

The collision avoidance logic adjuster may include an adjustment section recognizer configured to determine whether there is an adjustment section requiring the adjustment of the target selection condition for selecting the oncoming vehicle, and a target selection condition adjuster configured to adjust the target selection condition such that it is to be strengthened when the adjustment section is present ahead.

When there is a construction section in which a triangle warning sign or a plurality of rubber cones is sensed ahead on a road based on the forward situation data, the adjustment section recognizer may determine the construction section as the adjustment section.

When an obstacle is present ahead on a road based on the forward situation data and the subject vehicle or the oncoming vehicle is recognized as temporarily crossing the center of the road to avoid the obstacle, the adjustment section recognizer may determine a section in which the obstacle is present as the adjustment section.

When the driving lane is straight, the oncoming vehicle is moving, and there is no stationary object in a left or right area of the driving lane when a predicted time to collision (TTC) with the oncoming vehicle on the driving lane is within a preset time range, the adjustment section recognizer may determine the section in which the obstacle is present as the adjustment section.

When a radius of curvature in an area within a preset range in front of the subject vehicle is greater than a first set value and a variation of the radius of curvature is less than a second set value, the adjustment section recognizer may recognize the driving lane as a straight lane.

When the driving lane connecting a straight line and a curved line is recognized as being present ahead on a road on which the subject vehicle is traveling based on the forward situation data, the adjustment section recognizer may determine a section in which there is a curved lane as the adjustment section.

When the radius of curvature is less than or equal to the first set value in the area within the preset range in front of the subject vehicle or when the variation of the radius of curvature is greater than or equal to the second set value, the adjustment section recognizer may recognize the driving lane as the curved lane.

The target selection condition adjuster may perform the adjustment to reduce a heading angle range under a heading angle condition that selects, as the oncoming vehicle, a vehicle traveling straight forward within the driving lane of the subject vehicle and having a heading angle within a preset range with respect to the front of the subject vehicle being 0 degrees (deg); and perform the adjustment to increase an overlap ratio under an overlap condition that determines that there is a risk of collision when the overlap ratio between the oncoming vehicle selected as a control target and the subject vehicle is within a preset range.

When a heading angle condition that selects a vehicle having a heading angle of (180)±5 deg as the oncoming vehicle, and an overlap condition that determines that there is a risk of collision when an overlap ratio between the oncoming vehicle and the subject vehicle is in a range of from 55% to 100% are a normal target selection condition, the target selection condition adjuster may adjust the heading angle condition to be (180)±3 deg and the overlap condition to have an overlap ratio in range of from 75% to 100%.

According to another embodiment, there is provided an FCA method which is performed in a vehicle by a processor executing software instructions stored in a non-transitory memory. The method includes a forward sensing step of sensing, by a sensor unit, a situation in front of a subject vehicle provided with a collision-avoidance assist system, a collision avoidance logic adjustment step of adjusting a target selection condition for selecting an oncoming vehicle having a risk of collision based on forward situation data obtained by the sensing of the sensor unit, a collision avoidance determination step of selecting the oncoming vehicle by applying the adjusted target selection condition, and determining a collision risk value, and a collision avoidance control step of automatically controlling braking or steering while warning a driver when the collision risk value is greater than or equal to a preset value.

The collision avoidance logic adjustment step may include an adjustment section recognition step of determining whether there is an adjustment section requiring the adjustment of the target selection condition for selecting the oncoming vehicle, and a target selection condition adjustment step of adjusting the target selection condition such that it is to be strengthened to prevent a collision avoidance logic from operating sensitively when the adjustment section is present ahead.

When there is a construction section in which a triangle warning sign or a plurality of rubber cones is sensed ahead on a road based on the forward situation data, the adjustment section recognition step may include determining the construction section as the adjustment section.

When an obstacle is present ahead on the road based on the forward situation data and the subject vehicle or the oncoming vehicle is recognized as temporarily crossing the center of the road to avoid the obstacle, the adjustment section recognition step may include determining a section in which the obstacle is present as the adjustment section.

When the driving lane is straight, the oncoming vehicle is moving, and there is no stationary object in a left or right area of the driving lane when a predicted TTC with the oncoming vehicle on the driving lane is within a preset time range, the adjustment section recognition step may include determining the section in which the obstacle is present as the adjustment section.

When a radius of curvature in an area within a preset range in front of the subject vehicle is greater than a first set value and a variation of the radius of curvature is less than a second set value, the adjustment section recognition step may include recognizing the driving lane as a straight lane.

When the driving lane connecting a straight line and a curved line is recognized as being present ahead on the road on which the subject vehicle is traveling based on the forward situation data, the adjustment section recognition step may include determining a section in which there is a curved lane as the adjustment section.

When the radius of curvature is less than or equal to the first set value in the area within the preset range in front of the subject vehicle or when the variation of the radius of curvature is greater than or equal to the second set value, the adjustment section recognition step may include recognizing the driving lane as the curved lane.

The target selection condition adjustment step may include performing the adjustment to reduce a heading angle range under a heading angle condition that selects, as the oncoming vehicle, a vehicle traveling straight forward within the driving lane of the subject vehicle and having a heading angle within a preset range with respect to the front of the subject vehicle being 0 deg; and performing the adjustment to increase an overlap ratio under an overlap condition that determines that there is a risk of collision when the overlap ratio between the oncoming vehicle selected as a control target and the subject vehicle is within a preset range.

When a heading angle condition that selects a vehicle having a heading angle of (180)±5 deg as the oncoming vehicle, and an overlap condition that determines that there is a risk of collision when the overlap ratio between the oncoming vehicle and the subject vehicle is in an overlap ratio range of 55% or greater and 100% or less are a normal target selection condition, the target selection condition adjustment step may include adjusting the heading angle condition to be (180)±3 deg and the overlap condition to have an overlap ratio in range of from 75% to 100%.

According to embodiments described herein, it is possible to improve the reliability of a collision avoidance logic by applying a strengthened target selection condition only to some adjustment sections, such as, a construction section, an obstacle section, or a section having a curved lane, and by preventing the collision avoidance logic from operating for a vehicle that temporarily crosses into a driving lane of a subject vehicle to avoid a construction site or an obstacle.

In addition, it is possible to improve the performance of the collision avoidance logic while minimizing an increase in cost, simply by modifying software of a forward collision-avoidance assist (FCA) system to adjust a target selection condition of the collision avoidance logic and enable dual operations.

Additional advantages, objects, and features of the present disclosure are set forth in part in the description which follows and in part should become apparent to those having ordinary skill in the art upon examination of the following or may be learned from practice of the present disclosure. The objects and other advantages of the present disclosure may be realized and attained by the structure particularly pointed out in the written description and claims hereof as well as the appended drawings.

DETAILED DESCRIPTION

Figure 1:
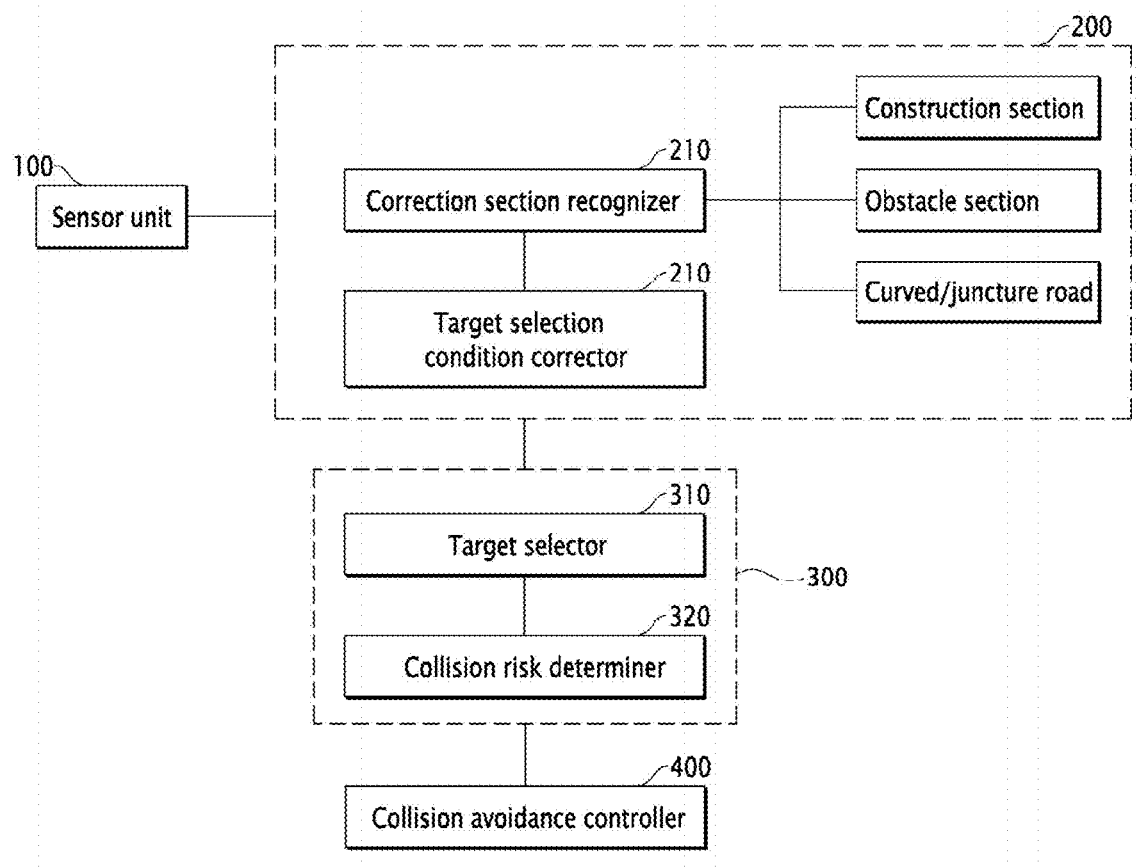
FIG. 1 is a block diagram illustrating a forward collision-avoidance assist (FCA) system according to an embodiment.

Hereinafter, embodiments of the present disclosure are described in detail with reference to the accompanying drawings, and the same or similar elements are given the same reference numerals regardless of reference symbols, and redundant description thereof has been omitted. In the following description, the terms "unit," "module," and "device" may be implemented as software or hardware, and a plurality of units, modules, or devices may be implemented as a single element or a single unit, module, or device may include a plurality of elements.

Although terms including ordinal numbers, such as "first," "second," etc., may be used herein to describe various elements, the elements are not limited by these terms and these terms are generally used to distinguish one element from another.

Throughout the disclosure, when an element is described as being "on," "under," "connected to," or "coupled to" another element, it may be directly "on," "under," "connected to," or "coupled to" the other element, or there may be one or more other elements intervening therebetween.

A singular expression includes the plural form unless the context clearly dictates otherwise. When a component, device, element, or the like of the present disclosure is described as having a purpose or performing an operation, function, or the like, the component, device, or element should be considered herein as being "configured to" meet that purpose or to perform that operation or function.

In addition, it is to be understood that a term such as "include" or "have" is intended to designate that elements described herein are present and does not preclude the possibility of addition or presence of one or more other elements.

In addition, the term "unit" or "control unit" included in the names of a hybrid control unit (HCU), a motor control unit (MCU), etc. is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, etc., and one or more processors that perform determination, calculation, decision, etc. desired for controlling a function assigned thereto.

Hereinafter, embodiments of the present disclosure are described in detail with reference to FIGS. 1 to 9.

FIG. 1 is a block diagram illustrating a forward collision-avoidance assist (FCA) system according to an embodiment.

Referring to FIG. 1, according to an embodiment, an FCA system may include a sensor unit 100 configured to sense a forward situation of a subject vehicle provided with a collision-avoidance assist system; and a collision avoidance logic adjuster 200 configured to adjust or change a target selection condition for selecting an oncoming vehicle having a risk of collision based on forward situation data obtained by the sensing of the sensor unit 100. The FCA system may further include a collision avoidance determiner 300 configured to select the oncoming vehicle by applying the adjusted or changed target selection condition and determine a collision risk value; and a collision avoidance controller 400 configured to automatically control braking or steering and warn a driver when the collision risk value is greater than or equal to a preset value.

The sensor unit 100 may include one or more sensor. For example, the sensor unit 100 may include a camera for obtaining a forward-looking image of the subject vehicle while the subject vehicle is traveling, and at least one sensing device configured to sense the forward situation of the subject vehicle, for example, a radar for sensing the presence or absence of an obstacle or an oncoming vehicle in front of the subject vehicle or a distance between the subject vehicle and the oncoming vehicle or the detected obstacle.

Based on the forward situation data obtained by the sensor unit 100, it is possible to detect whether there is a construction section or obstacle, or a curved road, which may trigger deceleration of the subject vehicle or lane change on a road on which the subject vehicle is traveling, in addition to an oncoming vehicle having a risk of collision.

The collision avoidance logic adjuster 200 may include an adjustment section recognizer 210 configured to determine whether there is an adjustment section requiring the adjustment of the target selection condition for selecting the oncoming vehicle, and a target selection condition adjuster 220 configured to adjust the target selection condition to be strengthened in order to prevent a collision avoidance logic from operating too sensitively when the adjustment section is present ahead.

There may be a change in a section in which a construction section or an obstacle is present ahead on the road on which the subject vehicle is traveling, for example, a lane being narrowed or curved. There may be a curved section on the road. Accordingly, there may be frequent occurrences of an overlapping portion between a vehicle traveling on an opposite lane and an extension line of a driving path on which the subject vehicle is traveling.

On these sections on the road, the driver decelerates the subject vehicle or pays more attention to these sections and thus a risk of an accident or collision with another vehicle could be substantially low. However, a general collision avoidance logic set in the FCA system may determine a high risk of collision and may thus sensitively perform a control operation such as a braking or avoidance steering control.

Accordingly, the collision avoidance logic adjuster 200 may perform the adjustment to apply the target selection condition in dual ways by distinguishing a general case in which the preset collision avoidance logic is applied to the forward situation of the subject vehicle that is traveling from other cases that are not the general case, thereby preventing the collision avoidance logic from sensitively operating when there is a low risk of an accident in some sections.

When a construction section is recognized as being present ahead on the road based on the forward situation data obtained from the sensor unit 100, the adjustment section recognizer 210 may determine that there is the adjustment section requiring the adjustment of the target selection condition.

Figure 2A:
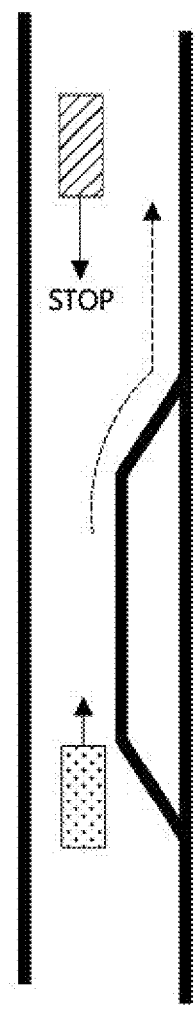
FIGS. 2A and 2B illustrate examples of a driving road in which a construction section is present.
Figure 2B:
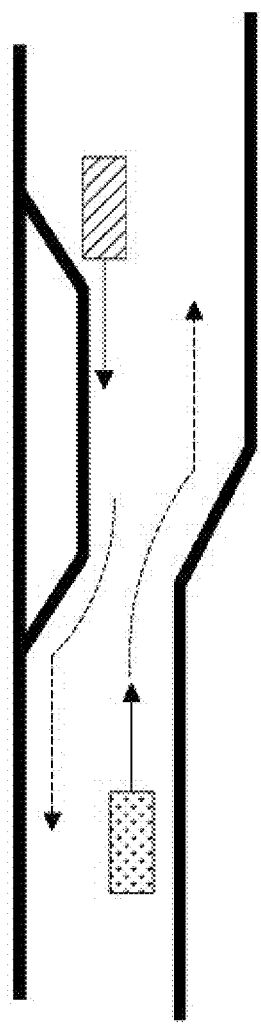

A construction section on a road on which vehicles travel may be recognized as being present as a certain section is closed as shown in FIG. 2A and FIG. 2B, and a triangle warning sign or a plurality of rubber cones indicating a closed construction section may be installed therefor.

Thus, when a triangle warning sign or a plurality of rubber cones is recognized ahead on the road by the camera or radar provided in the sensor unit 100, the adjustment section recognizer 210 may determine that there is a construction section.

In addition, when an obstacle is recognized as being present ahead based on the forward situation data obtained from the sensor unit 100, and the subject vehicle or the oncoming vehicle is recognized as temporarily crossing the center and coming into the driving path of the subject vehicle or the oncoming vehicle to avoid the obstacle, the adjustment section recognizer 210 may determine that there is the adjustment section requiring the adjustment of the target selection condition.

Figure 3A:
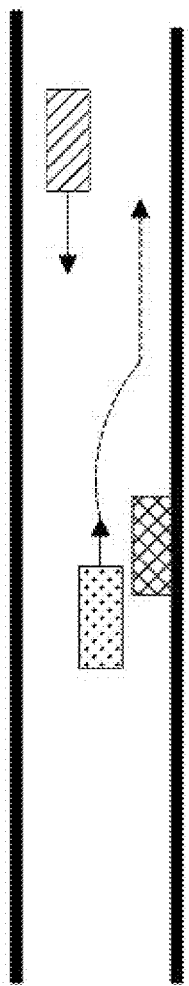
FIGS. 3A and 3B illustrate examples of a driving road in which an obstacle section is present.
Figure 3B:
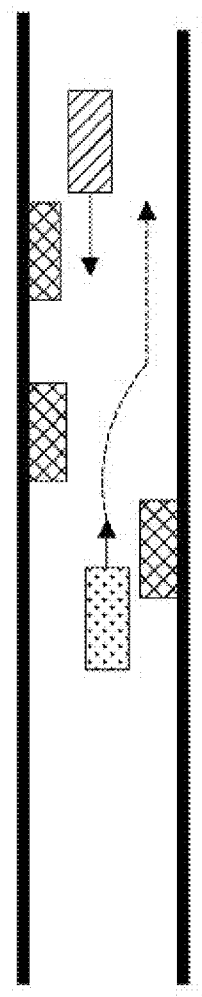
Figure 4:
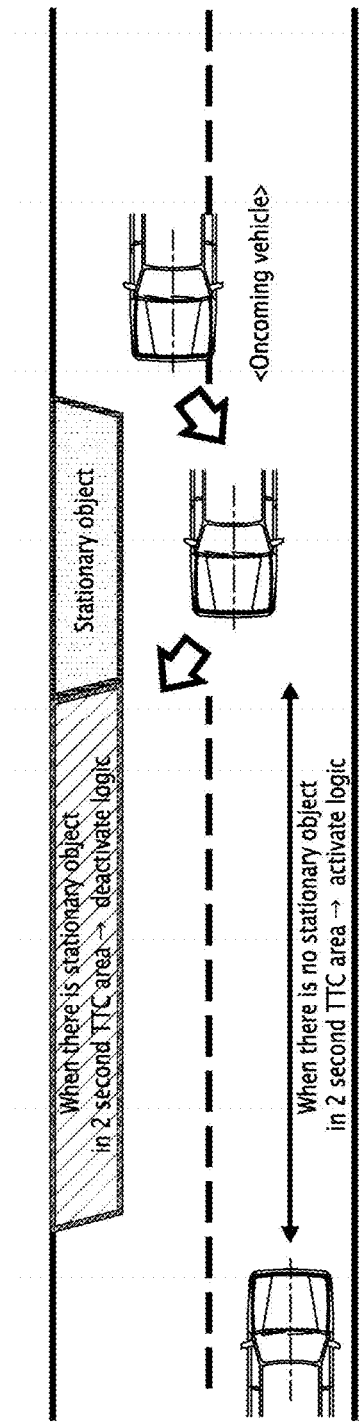
FIG. 4 illustrates an example of collision avoidance control for an obstacle section according to an embodiment.

When there is an obstacle on a road on which vehicles travel, the subject vehicle or the oncoming vehicle may temporarily cross the center and come into the driving path to avoid this obstacle on one side or both sides of the road as shown in FIGS. 3A and 3B. In such a section having an obstacle, temporary crossing of the center may occur, and it is thus desired to adjust the target selection condition.

However, in this case, it may not be easy to determine whether crossing the center and coming into the driving path by the oncoming vehicle is temporary or not, and thus the adjustment section recognizer 210 may determine the adjustment section requiring the adjustment of the target selection condition only when the driving path is straight, the oncoming vehicle is moving, and there is no stationary object in a left or right area of the driving path when a predicted time to collision (TTC) with the oncoming vehicle on the driving path is within a preset time range.

Thus, to determine whether the driving path is straight, the adjustment section recognizer 210 may recognize the driving path as a straight path when a radius of curvature in an area within a preset range (e.g., 50 meters (m)) ahead of the subject vehicle is greater than a first set value (e.g., 1000 R) and a variation of the radius of curvature is less than a second set value (e.g., 100 R), i.e., the radius of curvature>1000 R AND the variation of the radius of curvature<100 R. In this case, information on the radius of curvature ahead on the driving path may be obtained by map information or the like in addition to information obtained from the sensor unit 100.

In addition, the adjustment section recognizer 210 may determine the adjustment section only when the oncoming vehicle present on the straight driving path is a moving object. When the oncoming vehicle present on the straight driving path is a stationary object, it may be difficult to expect avoidance and a risk of collision may thus increase, and thus the general collision avoidance logic may operate.

In addition, when there is no stationary object on a left or right side on the road in an area (indicated as a "2 second TTC area" in FIG. 4) that is able to travel for the predicted TTC within a preset time on the driving path, the adjustment section recognizer 210 may determine the adjustment section requiring the adjustment of the target selection condition, or else the collision avoidance logic may be executed without the adjustment of the target selection condition.

Therefore, when there is an obstacle that triggers the oncoming vehicle to cross the center line of the road, but there is a stationary object (which may be the obstacle or another object) outside the 2 second TTC area, the adjustment section recognizer 210 may determine the adjustment section requiring the adjustment of the target selection condition, and may not determine the adjustment section requiring the adjustment of the target selection condition when there is no stationary object within the 2 second TTC area.

That is, when there is no stationary object on the left or right side of the road within the 2 second TTC area, it may be expected that the vehicle passing the obstacle would return to its original path, and thus the target selection condition may be adjusted, and the sensitive operation of the collision avoidance logic may be prevented.

In addition, when the driving path connecting a straight line and a curved line is recognized as being present ahead on the road on which the subject vehicle is traveling based on the forward situation data obtained from the sensor unit 100, the adjustment section recognizer 210 may determine that there is the adjustment section requiring adjustment of the target selection condition.

Figure 5A:
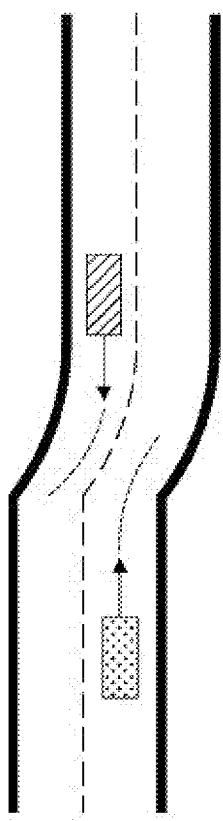
FIGS. 5A and 5B illustrate types of a driving road for which collision avoidance control is predicted to operate sensitively.
Figure 5B:
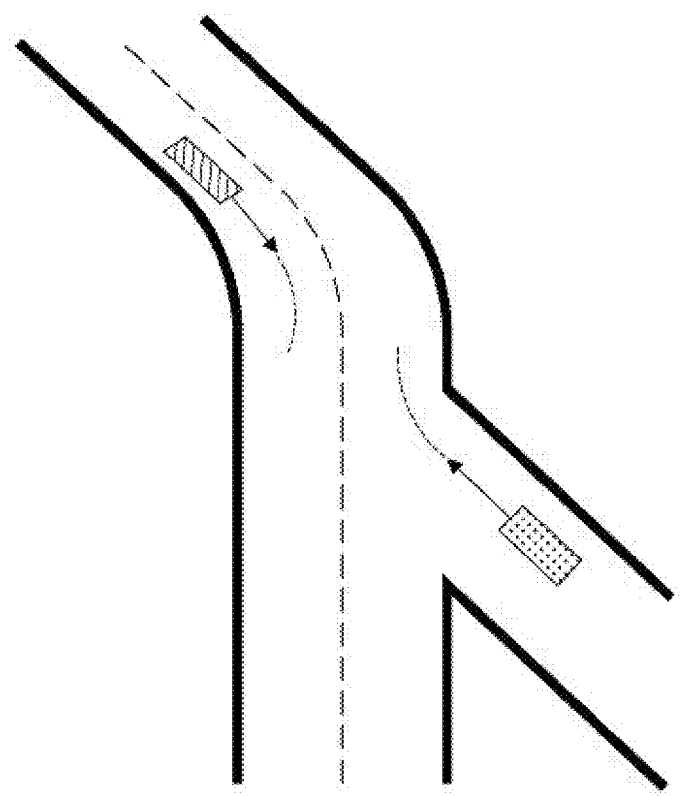
Figure 6:
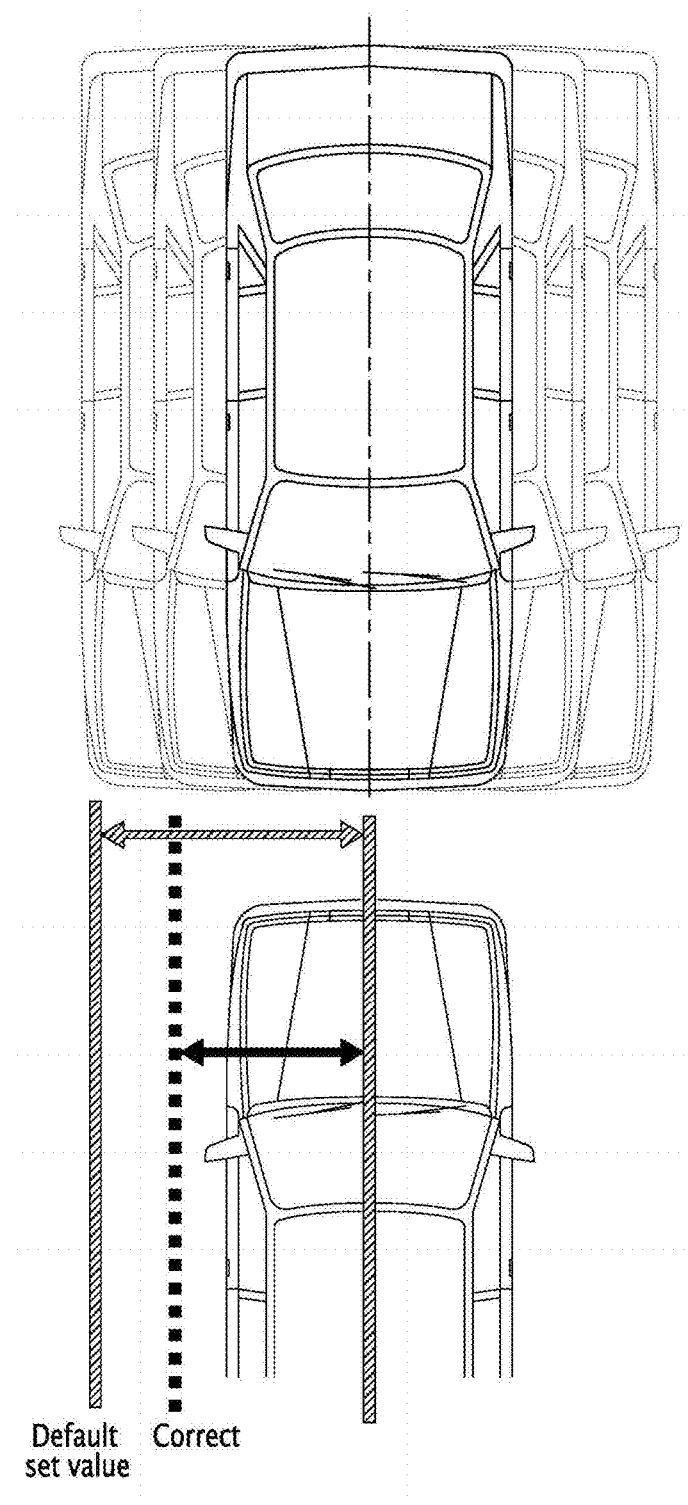
FIG. 6 illustrates an example of adjusting an overlap condition of a target selection condition according to an embodiment.
Figure 7:
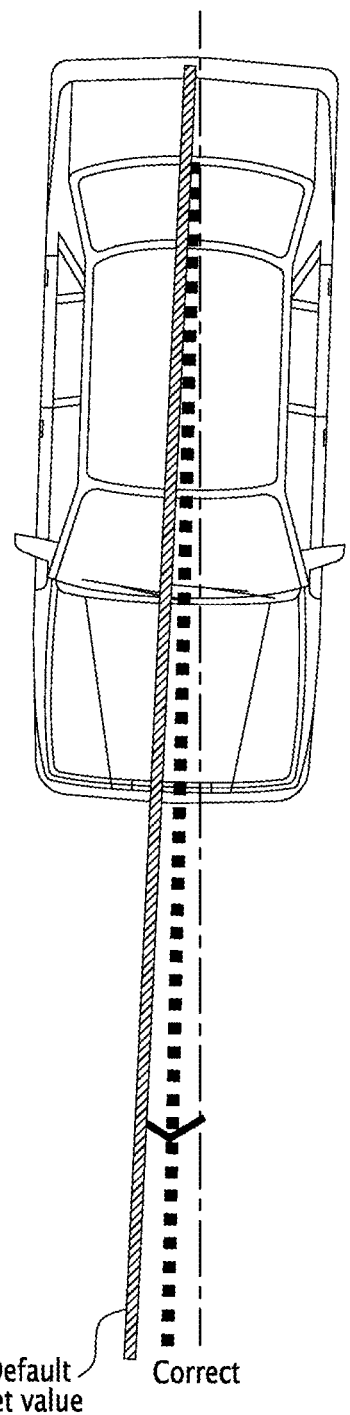
FIG. 7 illustrates an example of adjusting a heading angle condition of a target selection condition according to an embodiment.

When there is a curved path or there is a curved path at a junction as shown in FIGS. 5A and 5B, the sensor unit 100 may recognize that there is an oncoming vehicle in front of the subject vehicle even though the oncoming vehicle continues traveling on its lane.

Accordingly, for a section with such a curved path, it is desired to adjust the target selection condition such that the oncoming vehicle keeping its own lane is not selected as a target having a high risk of collision using lane information obtained from the camera.

Thus, to determine whether there is a curved path ahead on the driving path, the adjustment section recognizer 210 may determine a section having the curved path, when a radius of curvature in an area within a preset range (e.g., 50 m) ahead of the subject vehicle is less than or equal to the first set value (e.g., 1000 R), or a variation of the radius of curvature is greater than or equal to the second set value (e.g., 100 R), i.e., the radius of curvature 1000 R OR the variation of the radius of curvature 100 R, based on the forward situation data of the sensor unit 100.

In addition, when there is at least one adjustment section among a construction section, an obstacle section, or a curved path ahead on the road on which the subject vehicle is traveling, the target selection condition adjuster 220 may perform the adjustment to strengthen the target selection condition such that an oncoming vehicle having a risk of collision according to a normal target selection condition is not selected as an oncoming vehicle having a risk of collision in the adjustment section.

The normal target selection condition may include a heading angle condition for selecting, as the oncoming vehicle, a vehicle that travels straight within the driving path (or a driving lane) of the subject vehicle and has a heading angle of (180)±5 deg with respect to the front of the subject vehicle being 0 deg; and an overlap condition for determining that there is a risk of collision when an overlap ratio between the subject vehicle and the oncoming vehicle selected as a control target is in a range of 55% or greater and 100% or less.

However, the target selection condition adjuster 220 may strengthen both the heading angle condition and the overlap condition to more strictly select the oncoming vehicle and more strictly determine a risk of collision with the selected oncoming vehicle, thereby allowing the collision avoidance logic to operate only when it is determined that a risk of collision is higher than that in the case of the normal target selection condition only for a limited period of time corresponding to the adjustment section.

Accordingly, the target selection condition adjuster 220 may perform the adjustment to reduce the heading angle range under the heading angle condition that selects, as the oncoming vehicle, a vehicle traveling straight within the driving lane of the subject vehicle and having a heading angle within a certain range with respect to the front of the subject vehicle being 0 deg, and perform the adjustment to increase the overlap ratio under the overlap condition that determines that there is a risk of collision when the overlap ratio between the subject vehicle and the oncoming vehicle selected as the control target is in the certain range.

As an example of the adjustment of the target selection condition, the target selection condition adjuster 220 may adjust the heading angle condition (refer to FIG. 7) by selecting, as the oncoming vehicle, a vehicle traveling straight within the driving lane of the subject vehicle and having the heading angle of (180)±3 deg with respect to the front of the subject vehicle being 0 deg, as represented in Equation 1 below; and adjust the overlap condition (refer to FIG. 6) by determining that there is a risk of collision when the overlap ratio between the subject vehicle and the oncoming vehicle selected as the control target is in a range of from 75% to 100%.

$$55\% \leq |overlap| \leq 100\% \rightarrow 75\% |overlap| 100\% \text{ Heading angle:}(180)\pm5 \rightarrow (180)\pm3 \text{ deg} \quad \text{[Equation 1]}$$

According to an embodiment of the present disclosure, the collision avoidance logic adjuster 200 may include a processor (e.g., computer, microprocessor, CPU, ASIC, circuitry, logic circuits, etc.) and an associated non-transitory memory storing software instructions which, when executed by the processor, provides the functionalities of the adjustment section recognizer 210 and the target selection condition adjuster 220. Herein, the memory and the processor may be implemented as separate semiconductor circuits. Alternatively, the memory and the processor may be implemented as a single integrated semiconductor circuit. The processor may embody one or more processor(s).

The collision avoidance determiner 300 may include a target selector 310 configured to select an oncoming vehicle that is likely to cause a risk of collision with the subject vehicle based on the adjusted target selection condition when there is the adjustment section ahead on the road on which the subject vehicle is traveling; and a collision risk determiner 320 configured to determine a collision risk value by calculating an overlap ratio between the oncoming vehicle and the subject vehicle based on the adjusted target selection condition.

In this case, for the adjustment section, the oncoming vehicle may be selected and the collision risk value may be determined by applying the target selection condition strengthened by the target selection condition adjuster 220. Thus, for a vehicle temporarily crossing the center and coming into the driving lane of the subject vehicle to avoid a construction section or an obstacle, the collision avoidance logic may not operate. Accordingly, it is possible to prevent the collision avoidance logic from operating unnecessarily sensitively in the adjustment section and improve the reliability of the collision avoidance logic.

In addition, for a section that is not the adjustment section, a target vehicle may be selected based on the preset target selection condition and the collision risk value may be determined accordingly, and it is thus possible to detect and cope with a risk of a collision over a wider range and contribute to improving the driver's safety against a forward collision.

In other words, executing the collision avoidance logic dualized by temporarily strengthening the target selection condition only when the sensitive operation is unnecessary due to a surrounding situation other than an oncoming vehicle, while improving the driver's safety by setting the target selection condition to be wider, may contribute to improving the safety without inconvenience by the sensitive operation.

According to an embodiment of the present disclosure, the collision avoidance determiner 300 may include a processor (e.g., computer, microprocessor, CPU, ASIC, circuitry, logic circuits, etc.) and an associated non-transitory memory storing software instructions which, when executed by the processor, provides the functionalities of the target selector 310 and the collision risk determiner 320. Herein, the memory and the processor may be implemented as separate semiconductor circuits. Alternatively, the memory and the processor may be implemented as a single integrated semiconductor circuit. The processor may embody one or more processor(s).

When the collision risk value of the oncoming vehicle selected by the collision avoidance determiner 300 meets the target selection condition or the adjusted target selection condition, the collision avoidance controller 400 may determine that there is a risk of collision with the oncoming vehicle and may warn the driver of the risk of collision.

In addition, the collision avoidance controller 400 may control a braking device to decelerate or stop the subject vehicle or control a steering device to avoid a predicted collision area, so as to prevent a collision or reduce an impact thereby.

According to an embodiment of the present disclosure, the collision avoidance controller 400 may include a processor (e.g., computer, microprocessor, CPU, ASIC, circuitry, logic circuits, etc.) and an associated non-transitory memory storing software instructions which, when executed by the processor, provides the functionalities described above. Herein, the memory and the processor may be implemented as separate semiconductor circuits. Alternatively, the memory and the processor may be implemented as a single integrated semiconductor circuit. The processor may embody one or more processor(s).

Hereinafter, a FCA method is described with reference to FIGS. 8 and 9 according to another embodiment.

Figure 8:
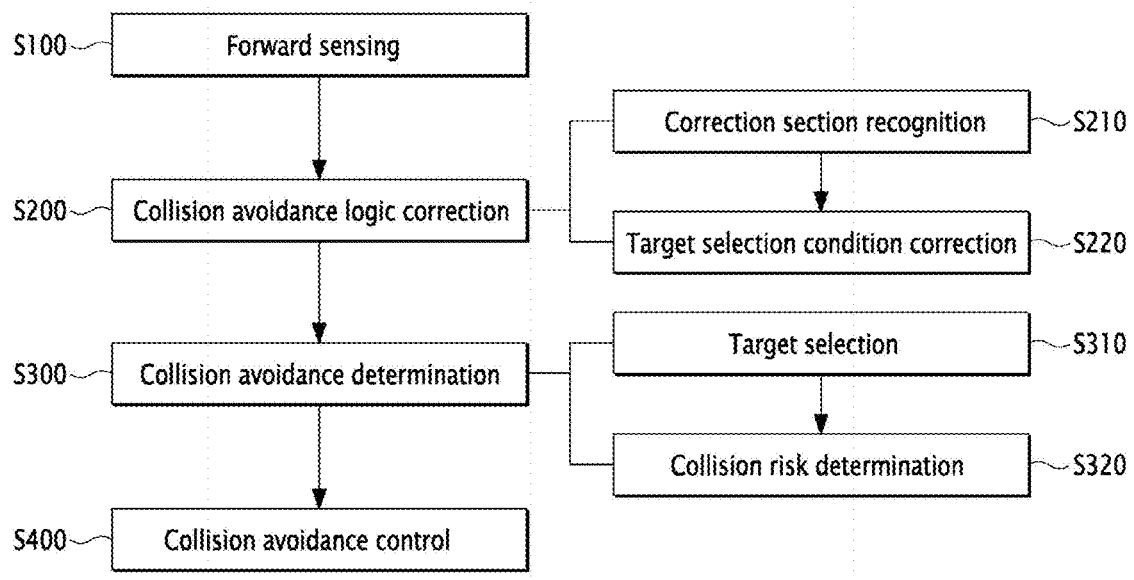
FIG. 8 is a diagram illustrating a FCA method according to an embodiment.
Figure 9:
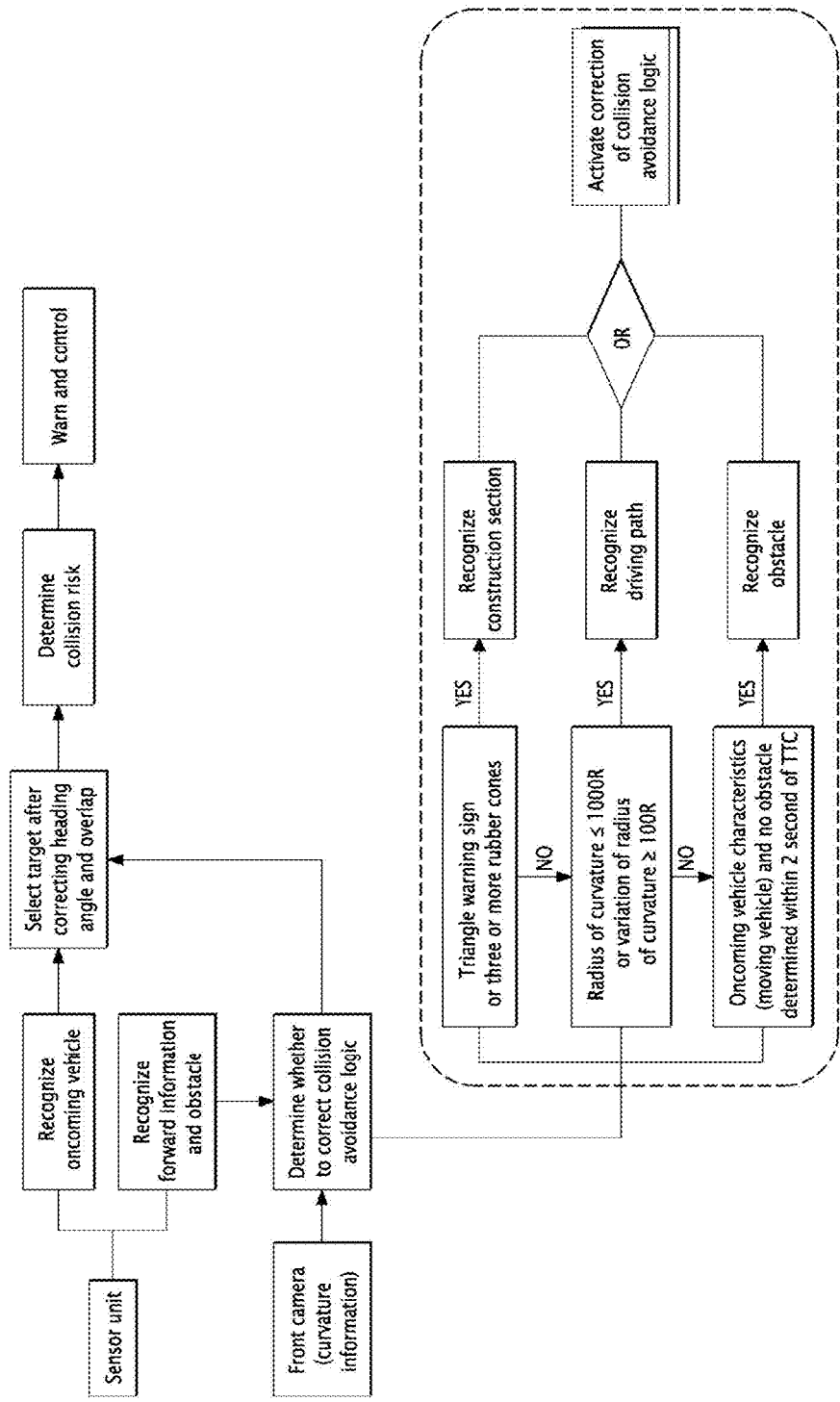
FIG. 9 is a diagram illustrating a control flowchart of a FCA method according to an embodiment.

Referring to FIGS. 8 and 9, a FCA method according to another embodiment may include a forward sensing step S100 of sensing, by a sensor unit, a forward situation of a subject vehicle provided with a collision-avoidance assist system, a collision avoidance logic adjustment step S200 of adjusting a target selection condition for selecting an oncoming vehicle having a risk of collision based on forward situation data obtained by the sensing of the sensor unit; a collision avoidance determination step S300 of applying the adjusted target selection condition to select the oncoming vehicle and determine a collision risk value, and a collision avoidance control step S400 of automatically controlling braking or steering while warning the driver when the collision risk value is greater than or equal to a preset value.

The forward sensing step S100 may include sensing an oncoming vehicle having a risk of collision based on the forward situation data obtained through the sensing of the sensor unit including, for example, a front camera or a front radar provided in the subject vehicle; and sensing the presence or absence of a construction section, an obstacle, or a curved lane on a road on which the subject vehicle is traveling.

The collision avoidance logic adjustment step S200 may include an adjustment section recognition step S210 of determining whether there is an adjustment section requiring the adjustment of the target selection condition for selecting the oncoming vehicle; and a target selection condition adjustment step S220 of adjusting the target selection condition to be strengthened to prevent the collision avoidance logic from operating sensitively in the presence of the adjustment section ahead on the road.

The collision avoidance logic adjustment step S200 may include performing the adjustment by applying the target selection condition in dual ways by distinguishing a general case in which the preset collision avoidance logic is applied as it is to the forward situation of the subject vehicle from another case, and it may thus be possible to prevent the collision avoidance logic from sensitively operating even with a low risk of an accident in some sections.

The adjustment section recognition step S210 may include determining that there is an adjustment section requiring the adjustment of the target selection condition, when a construction section is recognized as being present ahead on the road based on the forward situation data obtained from the sensor unit.

In an embodiment, the adjustment section recognition step S210 may include determining that there is the construction section ahead on the road when a triangle warning sign or a plurality of rubber cones is recognized as being present ahead on the road by the camera or radar provided in the sensor unit.

In addition, the adjustment section recognition step S210 may include determining that there is the adjustment section requiring the adjustment of the target selection condition when there is an obstacle ahead on the road based on the forward situation data obtained from the sensor unit and the subject vehicle or the oncoming vehicle is recognized as temporarily crossing the center to avoid the obstacle.

In this case, the adjustment section recognition step S210 may include determining that there is the adjustment section requiring the adjustment of the target selection condition only when the driving path is straight, the oncoming vehicle is moving, and there is no stationary object in a left or right area of the driving path when a predicted TTC with the oncoming vehicle on the driving path is within a preset time range.

To this end, the adjustment section recognition step S210 may include recognizing the driving path as a straight path when a radius of curvature is greater than a first set value (e.g., 1000 R) in an area within a preset range (e.g., 50 m) in front of the subject vehicle, and a variation of the radius of curvature is less than a second set value (e.g., 100 R), i.e., the radius of curvature>1000 R AND the variation of the radius of curvature<100 R.

In addition, the adjustment section recognition step S210 may include determining the adjustment section requiring the adjustment of the target selection condition when the oncoming vehicle present on the straight driving path is moving, and there is no stationary object on a left or right side of the road in an area (indicated as "2 second TTC area" in FIG. 4) in which driving is available for a predicted TTC within the preset time on the driving path. In other cases, the adjustment section requiring the adjustment of the target selection condition may not be determined.

In addition, the adjustment section recognition step S210 may include determining that there is the adjustment section requiring the adjustment of the target selection condition, even when a driving path connecting a straight line and a curved line is recognized as being present ahead on the road on which the subject vehicle is traveling based on the forward situation data obtained from the sensor unit.

When vehicles travel on a curved path or there is the curved path at a junction, the sensor unit may recognize that there is an oncoming vehicle in a forward direction of the subject vehicle even though the vehicle is traveling while maintaining its lane.

Accordingly, in a section having such a curved path, it may be desired to adjust the target selection condition such that the oncoming vehicle keeping its lane is not selected as a target having a high risk of collision using lane information obtained from the camera.

To this end, the adjustment section recognition step S210 may include recognizing the adjustment section having the curved path may be recognized, when a radius of curvature in an area of a preset range (e.g., 50 m) in front of the subject vehicle is less than or equal to the first set value (e.g., 1000 R) or when a variation of the radius of curvature is greater than or equal to the second set value (e.g., 100 R), i.e., the radius of curvature 1000 R OR the variation of the radius of curvature 100 R, based on the forward situation data of the sensor unit.

In addition, when there is at least one adjustment section among a construction section, an obstacle section, or a section having a curved path ahead on the road on which the subject vehicle is traveling, the target selection condition adjustment step S220 may include performing the adjustment to strengthen the target selection condition such that a vehicle that corresponds to an oncoming vehicle having a risk of collision according to a normal target selection condition is not to be selected as the oncoming vehicle having the risk of collision in the adjustment section.

The normal target selection condition may include a heading angle condition for selecting, as the oncoming vehicle, a vehicle that travels straight within the driving path (or a driving lane) of the subject vehicle and has a heading angle of (180)±5 deg with respect to the front of the subject vehicle being 0 deg; and an overlap condition for determining that there is a risk of collision when an overlap ratio between the subject vehicle and the oncoming vehicle selected as a control target is in a range of from 55% to 100%.

However, the target selection condition adjustment step S220 may include strengthening both the heading angle condition and the overlap condition to select the oncoming vehicle more strictly and determine a collision risk value of the selected oncoming vehicle more strictly. Thus, only when it is determined that a risk of collision is higher than that under the normal target selection condition temporarily only for the adjustment section, the collision avoidance logic may operate.

Accordingly, the target selection condition adjustment step S220 may include adjusting the heading angle condition by selecting, as the oncoming vehicle, a vehicle traveling straight within driving lane of the subject vehicle and having a heading angle of (180)±3 deg with respect to the front of the subject vehicle being 0 deg, and adjusting the overlap condition by determining that there is a risk of collision when an overlap ratio between the subject vehicle and the oncoming vehicle selected as a control target is in a range of 75% or greater and 100% or less.

In addition, the collision avoidance determination step S300 may include a target selection step S310 of selecting an oncoming vehicle that is likely to cause a risk of collision with the subject vehicle based on the adjusted target selection condition when there is an adjustment section ahead on the road on which the subject vehicle is traveling; and a collision risk determination step S320 of determining a collision risk value by calculating an overlap ratio between the oncoming vehicle and the subject vehicle based on the adjusted target selection condition.

When there is the adjustment section in front of the subject vehicle, the collision avoidance determination step S300 may include selecting the oncoming vehicle and determining the collision risk value by applying the strengthened target selection condition. In contrast, for a section that is not the adjustment section, the collision avoidance determination step S300 may include selecting a target vehicle and determining the collision risk value, based on the preset target selection condition.

As described above, applying the target selection condition in dual ways based on a surrounding situation other than the subject vehicle and the oncoming vehicle may prevent the collision avoidance logic from operating excessively sensitively while improving the driver's safety.

In addition, when the collision risk value of the oncoming vehicle selected in the collision avoidance determination step S300 meets the target selection condition or the adjusted target selection condition, the collision avoidance control step S400 may include determining that there is a risk of collision with the corresponding oncoming vehicle and warning the driver of the risk of the collision.

In addition, the collision avoidance control step S400 may include operating a braking device or a steering device of the subject vehicle when collision avoidance or impact reduction is required, thereby improving the driver's safety.

On the other hand, the present disclosure described above may be embodied as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc.

Therefore, the above detailed description should not be construed as restrictive and should be considered as illustrative in all respects. The scope of the present disclosure should be determined by a reasonable interpretation of the appended claims, and all modifications within the equivalent scope of the present disclosure are included in the scope of the present disclosure.

REFERENCE NUMERALS

100: Sensor unit
200: Collision avoidance logic adjuster
210: Adjustment section recognizer
220: Target selection condition adjuster
300: Collision avoidance determiner
310: Target selector
320: Collision risk determiner
400: Collision avoidance controller

What is claimed is:

1. A forward collision-avoidance assist (FCA) system, comprising:
    a sensor unit configured to sense a situation in front of a subject vehicle provided with the forward collision-avoidance assist system;
    a collision avoidance logic adjuster configured to adjust a target selection condition to be strengthened for selecting an oncoming vehicle having a risk of collision, based on forward situation data obtained by the sensor unit, and configured to operate the FCA system less sensitively;
    a collision avoidance determiner configured to:
        select the oncoming vehicle by applying the adjusted target selection condition, and
        determine a collision risk value; and
    a collision avoidance controller configured to automatically control braking or steering of the subject vehicle when the collision risk value is greater than or equal to a preset value.

2. The FCA system of claim 1, wherein the collision avoidance logic adjuster comprises:
    an adjustment section recognizer configured to determine that an adjustment section requiring adjustment of the target selection condition for selecting the oncoming vehicle is present when a preset condition is satisfied; and
    a target selection condition adjuster configured to adjust the target selection condition to be strengthened when the adjustment section is present ahead of the subject vehicle.

3. The FCA system of claim 2, wherein the adjustment section recognizer is configured to:
    determine the preset condition is satisfied when there is a construction section in which a triangle warning sign or a plurality of rubber cones is sensed ahead on a road based on the forward situation data; and
    determine the construction section as the adjustment section.

4. The FCA system of claim 2, wherein the adjustment section recognizer is configured to:
    determine the preset condition is satisfied when an obstacle is present ahead on a road based on the forward situation data and the subject vehicle or the oncoming vehicle is recognized as temporarily crossing a center line of the road to avoid the obstacle; and
    determine a section in which the obstacle is present as the adjustment section.

5. The FCA system of claim 4, wherein the adjustment section recognizer is configured to:
    determine the preset condition is satisfied when a driving lane is straight, the oncoming vehicle is moving, and there is no stationary object when a predicted time to collision (TTC) with the oncoming vehicle on the driving lane is within a preset time range; and
    determine the section in which the obstacle is present as the adjustment section.

6. The FCA system of claim 5, wherein the adjustment section recognizer is configured to:
    when a radius of curvature in an area within a preset range in front of the subject vehicle is greater than a first set value and a variation of the radius of curvature is less than a second set value, recognize the driving lane as a straight lane.

7. The FCA system of claim 2, wherein the adjustment section recognizer is configured to:
    when a driving lane connecting a straight line and a curved line is recognized as being present ahead on a road on which the subject vehicle is traveling, based on the forward situation data, determine a section in which there is the curved line as the adjustment section.

8. The FCA system of claim 7, wherein the adjustment section recognizer is configured to:
    when a radius of curvature is less than or equal to a first set value in an area within a preset range in front of the subject vehicle or when a variation of the radius of curvature is greater than or equal to a second set value, recognize the driving lane as a curved lane.

9. The FCA system of claim 2, wherein the target selection condition adjuster is configured to:
reduce a heading angle range under a heading angle condition by which the oncoming vehicle is determined as a vehicle traveling straight forward within a driving lane of the subject vehicle and having a heading angle within a preset range with respect to the front of the subject vehicle; and
increase an overlap ratio under an overlap condition by which a risk of collision is determined when the overlap ratio between the oncoming vehicle selected as a control target and the subject vehicle is within a preset range.

10. A forward collision-avoidance assist (FCA) method for a vehicle, comprising:
a forward sensing step of sensing, by a sensor unit, a situation in front of a subject vehicle provided with a collision-avoidance assist system;
a collision avoidance logic adjustment step of adjusting a target selection condition to be strengthened for selecting an oncoming vehicle having a risk of collision based on forward situation data obtained by the sensor unit, and operating an FCA system less sensitively;
a collision avoidance determination step of selecting the oncoming vehicle by applying the adjusted target selection condition, and determining a collision risk value; and
a collision avoidance control step of automatically controlling braking or steering of the subject vehicle while warning a driver when the collision risk value is greater than or equal to a preset value.

11. The FCA method of claim 10, wherein the collision avoidance logic adjustment step comprises:
an adjustment section recognition step of determining that an adjustment section requiring adjustment of the target selection condition for selecting the oncoming vehicle is present when a preset condition is satisfied; and
a target selection condition adjustment step of adjusting the target selection condition such that it is to be strengthened to prevent a collision avoidance logic from operating sensitively when the adjustment section is present ahead.

12. The FCA method of claim 11, wherein the adjustment section recognition step comprises:
determining the preset condition is satisfied when there is a construction section in which a triangle warning sign or a plurality of rubber cones is sensed ahead on a road based on the forward situation data; and
determining the construction section as the adjustment section.

13. The FCA method of claim 11, wherein the adjustment section recognition step comprises:
determining the preset condition is satisfied when an obstacle is present ahead on a road based on the forward situation data and the subject vehicle or the oncoming vehicle is recognized as temporarily crossing a center line of the road to avoid the obstacle; and
determining a section in which the obstacle is present as the adjustment section.

14. The FCA method of claim 13, wherein the adjustment section recognition step comprises:
determining the preset condition is satisfied when a driving lane is straight, the oncoming vehicle is moving, and there is no stationary object in a left or right area of the driving lane when a predicted time to collision (TTC) with the oncoming vehicle on the driving lane is within a preset time range; and
determining the section in which the obstacle is present as the adjustment section.

15. The FCA method of claim 14, wherein the adjustment section recognition step comprises:
when a radius of curvature in an area within a preset range in front of the subject vehicle is greater than a first set value and a variation of the radius of curvature is less than a second set value, recognizing the driving lane as a straight lane.

16. The FCA method of claim 11, wherein the adjustment section recognition step comprises:
when a driving lane connecting a straight line and a curved line is recognized as being present ahead on a road on which the subject vehicle is traveling based on the forward situation data, determining a section in which there is a curved lane as the adjustment section.

17. The FCA method of claim 16, wherein the adjustment section recognition step comprises:
when a radius of curvature is less than or equal to a first set value in an area within a preset range in front of the subject vehicle or when a variation of the radius of curvature is greater than or equal to a second set value, recognizing the driving lane as the curved lane.

18. The FCA method of claim 11, wherein the target selection condition adjustment step comprises:
performing the adjustment to reduce a heading angle range under a heading angle condition that selects, as the oncoming vehicle, a vehicle traveling straight forward within a driving lane of the subject vehicle and having a heading angle within a preset range with respect to the front of the subject vehicle being 0 degrees (deg); and performing the adjustment to increase an overlap ratio under an overlap condition that determines that there is a risk of collision when the overlap ratio between the oncoming vehicle selected as a control target and the subject vehicle is within a preset range.

19. The FCA method of claim 18, wherein the target selection condition adjustment step comprises:
when a heading angle condition for selecting a vehicle having a heading angle of (180)±5 deg as the oncoming vehicle, and an overlap condition for determining a risk of collision when the overlap ratio between the oncoming vehicle and the subject vehicle is in an overlap ratio range of 55% or greater and 100% or less are a normal target selection condition, adjusting the heading angle condition to be (180)±3 deg and the overlap condition to have an overlap ratio in range of from 75% to 100%.

20. A non-transitory computer-readable storage medium storing a set of instructions executed by a processor to cause the processor to perform acts of:
using a sensor unit to obtain a situation in front of a vehicle provided with a collision-avoidance assist system;
adjusting a target selection condition to be strengthened for selecting an oncoming vehicle having a risk of collision based on forward situation data obtained by the sensor unit;
operating a forward collision-avoidance assist (FCA) system less sensitively;
selecting the oncoming vehicle by applying the adjusted target selection condition, and determining a collision risk value; and automatically controlling braking or steering of the vehicle while warning a driver when the collision risk value is greater than or equal to a preset value.

\* \* \* \* \*